Dec. 29, 1931.  H. W. LANGBEIN  1,838,413

METHOD OF TESTING BRAKES

Filed May 18, 1927

INVENTOR:
HAROLD W. LANGBEIN
By Fred A. Lewis
ATTORNEY.

Patented Dec. 29, 1931

1,838,413

UNITED STATES PATENT OFFICE

HAROLD W. LANGBEIN, OF LOS ANGELES, CALIFORNIA

METHOD OF TESTING BRAKES

Application filed May 18, 1927. Serial No. 192,272.

This invention relates to devices for testing brakes of vehicles such as automobiles, and this application is a continuation in-part of my application entitled Brake testing machine, Serial No. 65,604, filed October 29, 1925.

After the brakes of an automobile have been tightened they are tested to determine what distance is required to stop the automobile when it is traveling at a certain speed. At the present time this testing is done on the road.

It is an object of this invention to provide a method of testing brakes whereby the distance required to stop the machine which is traveling at a certain rate of speed by applying the brakes may be determined while the vehicle is stationary. By using my invention it is possible to set the brakes in the shop, so that the vehicle may be stopped at a predetermined distance.

Another object of the invention is to provide an apparatus for carrying out the above-noted methods.

The invention may be best understood by reference to the accompanying drawings in which.

Figure 1:
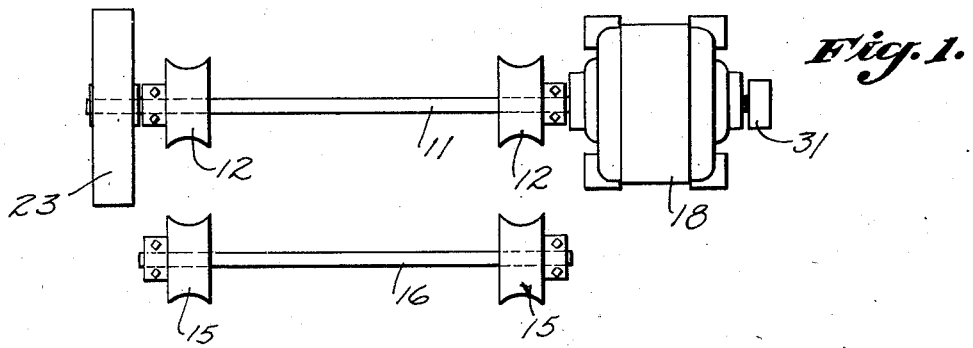
Fig. 1 is a plan view of a portion of the apparatus of the invention.
Figure 2:
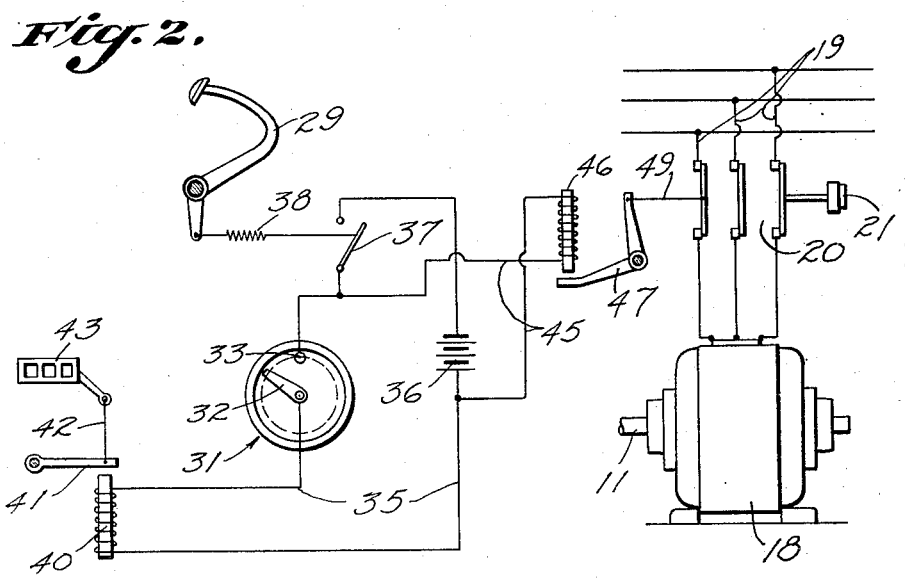
Fig. 2 is a diagram showing the electrical system of the invention.

Referring particularly to Fig. 1, the invention provides a drive means having a drive shaft 11 on which members in the form of drive rollers 12 are secured. The drive rollers 12 have outer surfaces which are concave and are spaced a distance apart to receive rear wheels 13 of an automobile 14. Placed opposite the drive rollers 12 are idler rollers 15 mounted on a shaft 16 which cooperate with the drive rollers 12 to support the wheels 13. The drive means is operated by a power means which, in this invention, is in the form of a motor 18. The motor 18, as illustrated in Fig. 2, is supplied with current through three-phase wiring 19 which includes a main switch 20. The main switch 20 may be closed by means of an operating button 21. Secured on the drive shaft and forming a part of the drive means is a fly-wheel 23. The fly-wheel 23 is a momentum member and its function is to maintain the drive means in rotation even after the motor 18 is deenergized. The fly-wheel 23 is removable so that for different automobiles being tested, different sizes of fly-wheels may be used.

Figure 3:
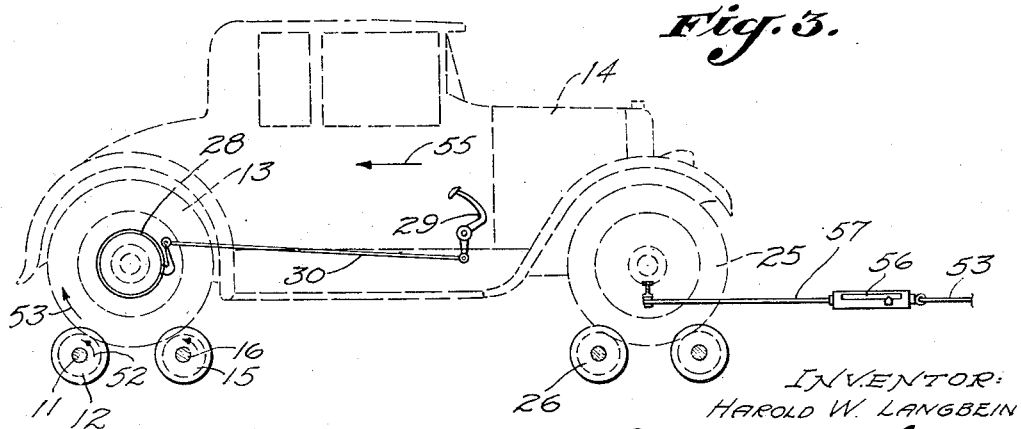
Fig. 3 is an elevational view of the invention showing its utility.

As shown in Fig. 3 front wheels 25 of the vehicle 14 are carried by supporting rollers 26. The purpose of the supporting rollers 26 is to align the vehicle 14 so that the axis of the rear wheels 13 is parallel to the axis of the drive shaft 11.

The rear wheels 13 have brakes 28 which are operated by a brake lever 29 of the vehicle 14. The brake lever 29 is connected to the brakes 28 of the wheels 13 by rods 30 as illustrated in Fig. 3. As shown best in Figs. 1 and 2 a timer 31, including a moving contact 32 and a stationary contact 33, is mounted so that the moving contact 32 is driven by the drive shaft 11. The contacts 32 and 33, as illustrated in Fig. 2, are connected in an electric circuit 35. This electric circuit 35 is supplied with electricity by any suitable energy source such as the battery 36. A control switch 37 is provided in the circuit 35, which control switch is connected by a member 38 to the brake lever 29. When the brake lever 29 is depressed to operate the brakes 28, the control switch 37 is closed, and when the moving contact 32 of the timer 31 moves into engagement with the stationary contact 33 thereof, the electricity will flow through the circuit 35. This circuit 35 includes a magnet 40 which operates an armature 41. The armature 41 is connected by a member 42 to a counter 43. From the drawings it will be seen that the magnet 40 will be energized once every time the drive shaft 11 rotates; consequently the counter will be operated once every revolution of the drive shaft 11. A circuit 45 is provided which is connected to the circuit 35 in such a manner that current will flow therethrough when the control switch 37 is closed. This circuit includes a magnet 46 which operates a bell-crank 47 when it is energized. The bell crank 47 is connected by a member 49 to the main switch 20 which controls the supply of electricity to the motor 18. It will be seen that when the control switch 37 is closed the bell-crank 47 is operated so that the main switch 20 is opened and the motor 18 will be de-energized.

The operation of this much of the invention is as follows:

The vehicle 14 is first placed on the apparatus as illustrated in Fig. 3, so that the wheels 13 are properly supported by the drive rollers 12 and the idler rollers 15. The main switch 20 which is open at this time is closed by manually depressing the button 21. The drive means is set into rotation by the motor 18 in a direction indicated by the arrow 52 of Fig. 3, and the rear wheels 13 of the vehicle are driven by their engagement with the drive rollers 12 in a direction indicated by the arrow 53 of Fig. 3. When the wheels are so driven the speedometer will indicate the rate of speed that the automobile would be traveling if it were on the road. When a certain predetermined speed is attained, the brake lever is depressed and the brakes 28 are applied. Simultaneously with the applying of the brakes 28, the control switch 37 is closed. The circuits 35 and 45 are instantaneously energized so that the timer 31 is caused to function and the main switch 20 is thrown out so that the motor 18 is deenergized. The drive means, therefore, is not positively driven by the motor 18 but is maintained in rotation by inertia or momentum supplied by the heavy fly-wheel 23. The brakes 28 when applied retard the rotation of the wheels 13, and the wheels 13 place a resistance on the drive rollers 12 which retards the rotation of the drive means. The timer 31 operates until the drive means is stopped by reason of the applying of the brakes 28. Every revolution of the drive shaft 11 is indicated on the counter 43. The counter 43 may be designed to register the amount of foot travel of the wheels 13 required for the stopping of them when the brakes 28 are applied or may just register the number of rotations of the drive shaft 11. If this is the case, the foot travel of the wheels may be determined by reference to a suitable chart.

When the brakes 28 are applied, there is a tendency for the rear wheels 13 to be slowed with respect to the drive rollers 12. This causes the drive rollers 12 to exert a pull on the vehicle 14 in the direction indicated by the arrow 55 of Fig. 3. My invention provides a means for ascertaining the magnitude of this pull. Referring to Fig. 3 a dynamometer, such as a balance 56, is connected to the vehicle 14 by a member 57 and is also connected to a stationary part, not shown, by a member 53. The pull on the vehicle 14 in the direction of the arrow 55 is indicated on the dynamometer 56. It is evident that the pull on the vehicle 14 is in a certain ratio to the braking pressure of the brakes 28. The ratio for each different automobile may be determined and a chart made so that the braking pressure may also be ascertained.

From the foregoing description it will be seen that this invention provides for the testing of the brakes of an automobile in the shop and while the automobile is stationary. This saves considerable time and the method is quite accurate.

The part of the invention which provides for the measuring of the braking pressure is important to the invention.

In the foregoing description the drive rollers 12 and the fly-wheel 23 are driven by motor 18. I wish it to be understood that any means of driving these parts and the wheels 13 are within the province of this invention. As an illustration of another drive means the engine of the vehicle 14 may be used by putting the engine in gear.

I claim as my invention:

1. A method of determining the distance required to stop a vehicle by applying its brakes, which method comprises: rotating the wheels of said vehicle on which the brakes operate by a power drive means capable of storing substantial amounts of kinetic energy; shutting off the power drive means from the wheels; applying said brakes to consume said stored energy; and measuring the movement of said drive means during the time that said brakes are applied.

2. A method of determining the distance required to stop a vehicle by applying its brakes, which method comprises: rotating the wheels of said vehicle on which the brakes operate by a power drive means separate from said vehicle and capable of storing substantial amounts of kinetic energy; shutting off the power drive means from the wheels; applying said brakes to consume said stored energy; and measuring the movement of said drive means during the time that said brakes are applied.

3. A method of determining the distance required to stop a vehicle by applying its brakes comprising: driving the wheels of a vehicle on which the brakes operate by power separate from said vehicle; shutting off the application of said power; applying said brakes; and measuring the movement of the drive means after said brakes have been applied.

4. A method of determining the distance required to stop a vehicle by applying its brakes comprising: driving the wheels of a vehicle on which the brakes operate by power separate from said vehicle; simultaneously shutting off the application of said power and applying said brakes; and measuring the movement of the drive means after said brakes have been applied.

5. A method of testing brakes of a vehicle comprising: placing the wheels of the vehicle on which the brakes operate, in driving relation with a drive means; supplying power to said drive means so as to drive said wheels; shutting off the application of said power so that said wheels are driven by the momentum of said drive means; applying said brakes; and measuring the movement of the drive means after said brakes have been applied.

6. A method as presented in claim 5 in which the power is shut off and the brakes applied simultaneously.

7. A method of determining the distance required to stop a vehicle by applying its brakes comprising: rotating the wheels of a vehicle on which the brakes operate; applying said brakes; measuring any rotation of a member bearing against at least one of said wheels which takes place after said brakes have been applied; and measuring the pull on said vehicle when said brakes are applied.

8. A method of determining the distance required to stop a vehicle by applying its brakes comprising: driving the wheels of a vehicle on which the brakes operate by power separate from said vehicle; shutting off said power; holding the vehicle against its tendency to move when brakes are applied; applying said brakes; measuring the movement of the drive means after said brakes have been applied; and measuring the pull on said vehicle when said brakes are applied.

9. A method of testing brakes of a vehicle comprising: placing the wheels of the vehicle on which the brakes operate, in driving relation with a drive means; supplying power to said drive means so as to drive said wheels; shutting off said power so that said wheels are driven by the momentum of said drive means; applying said brakes; measuring the movement of the drive means after said brakes have been applied; and measuring the pull on said vehicle when said brakes are applied.

10. A brake testing apparatus including: drive means for driving the wheels of the vehicle on which the brakes operate; power means for operating said drive means; shut-off means for shutting off said power means so that said wheels are driven by the momentum of said drive means; and a dynamometer for measuring the pull on said vehicle by said drive means when said brakes are applied.

11. A brake testing apparatus for vehicles including: a drive means separate from said vehicle and operatively connected to those wheels of the vehicle on which the brakes operate; power means for operating said drive means; and means actuated by the application of said brakes for shutting off said power means so that said wheels are driven by the momentum of said drive means.

12. A brake testing apparatus for vehicles including: a drive means separate from said vehicle and operatively connected to those wheels of the vehicle on which the brakes operate; power means for operating said drive means; means actuated by the application of said brakes for shutting off said power means so that said wheels are driven by the momentum of said drive means; indicating means for measuring the movement of said drive means; and means actuated by the application of said brakes for operatively connecting said indicating means and said drive means during the time that said brakes are applied.

13. A brake testing apparatus for vehicles including: a drive means separate from said vehicle and operatively connected to those wheels of the vehicle on which the brakes operate; power means for operating said drive means; means actuated by the application of said brakes for shutting off said power means so that said wheels are driven by the momentum of said drive means; a counting device; a timer connected to said drive means and adapted to operate said counting device; and means for operatively connecting said timer and said counting device when said brakes are actuated.

14. In combination with a vehicle having a pair of wheels equipped with brakes and a lever for actuating said brakes: a drive means for driving said wheels; power means for operating said drive means; a main switch controlling the energization of said power means, said main switch being electrically operated by a control circuit; an auxiliary switch actuated by said lever and electrically connected in said control circuit; a magnetically operated counter; and a timer electrically connected to the magnetic system of said counter and operatively connected to said drive means, said auxiliary switch controlling the time during which said counter is successively energized by said timer.

In testimony whereof, I have hereunto set my hand at Los Angeles, California, this 14th day of May, 1927.

HAROLD W. LANGBEIN.